United States Patent [19]

Kijima et al.

[11] Patent Number: 4,542,920
[45] Date of Patent: Sep. 24, 1985

[54] VEHICLE REAR-SUSPENSION MECHANISM

[75] Inventors: Takao Kijima; Jiro Maebayashi, both of Hiroshima, Japan

[73] Assignee: Mazda Motor Corporation, Hiroshima, Japan

[21] Appl. No.: 510,813

[22] Filed: Jul. 5, 1983

[30] Foreign Application Priority Data

Jul. 7, 1982 [JP] Japan ................................. 57-118121
Jul. 7, 1982 [JP] Japan ................................. 57-118122
Jul. 13, 1982 [JP] Japan ................................ 57-121427
Jul. 16, 1982 [JP] Japan ................................ 57-124121

[51] Int. Cl.$^4$ ........................... B60G 3/26; B60G 7/00
[52] U.S. Cl. .................................. 280/701; 180/73 R; 267/20 R; 280/689; 280/690
[58] Field of Search .................. 280/701, 660–671, 280/673–675, 688, 689, 690, 780; 267/20 R, 57 R; 180/73 R

[56] References Cited

U.S. PATENT DOCUMENTS

| | | | |
|---|---|---|---|
| 2,998,265 | 8/1961 | Kozicki | 267/20 R X |
| 4,143,887 | 3/1979 | William et al. | 267/57 R X |
| 4,153,272 | 5/1979 | Fiedler et al. | 280/689 |
| 4,415,178 | 11/1983 | Hatsushi et al. | 267/57 R X |
| 4,421,332 | 12/1983 | Kosak et al. | 280/701 X |
| 4,436,175 | 3/1984 | Watanabe et al. | 280/688 X |
| 4,440,419 | 4/1984 | Kosak et al. | 280/701 X |

Primary Examiner—Joseph F. Peters, Jr.
Assistant Examiner—Mitchell J. Hill
Attorney, Agent, or Firm—Fleit, Jacobson, Cohn & Price

[57] ABSTRACT

A body side support member such as the semi trailing arm of a semi trailing type rear-suspension, the strut of a strut type rear-suspension or the like is connected to a wheel hub for a rear wheel by way of a resilient connecting means such as a pair of resilient bushings to permit the wheel hub to change its position with respect to the body side support member. An end of a stabilizer is connected to the wheel hub so that, when the rear wheel on the wheel hub bumps, the rear wheel is caused to toe in by the counterforce of the stabilizer produced upon bump thereof.

20 Claims, 22 Drawing Figures

VEHICLE REAR-SUSPENSION MECHANISM

CROSS-REFERENCE TO RELATED APPLICATIONS

The following are closely related copending U.S. patent applications:

| U.S. Serial No. | Filing Date |
| --- | --- |
| 489,106 | April 27, 1983 |
| 489,132 | April 27, 1983 |
| 489,492 | April 28, 1983 |
| 498,551 | April 28, 1983 |
| 498,433 | May 26, 1983 |
| 513,028 | July 12, 1983 |

BACKGROUND OF THE INVENTION

1. Field of the Invention

This invention relates to a rear-suspension mechanism for a vehicle, and more particularly to an improved rear-suspension mechanism for a vehicle, exhibiting an excellent toe-in effect.

2. Description of the Prior Art

As is well known, the rear-suspension system for a vehicle is desired to be arranged so that the rear wheels or the tires are caused to toe in during travel, especially during cornering, in order to improve driving stability, driving comfort and the like. The centrifugal force exerted on the vehicle body during cornering acts on the rear-suspension as a lateral force. The tires are desired to counteract the lateral force with an increased resisting force in order to maximize the critical acceleration G in turning. The resisting force against the lateral force can be increased by causing the tires on the rear wheels to toe in to create a slip angle. By increasing the resisting force, the road-gripping force of the rear tires can be improved and the tendency to under-steer can be enhanced, whereby the driving stability of the vehicle is improved.

The resisting force against the lateral force can be further increased by tilting the outer (with respect to the turning direction) rear wheel to give a negative camber to the outer rear wheel during cornering.

Further, when the accelerator pedal is pushed down during cornering, a driving force is exerted on the tires, while when the accelerator pedal is released during cornering, a braking force is exerted on the tires. The tires tend to toe out upon release of the accelerator pedal which has been depressed, while they tend to toe in upon depression of the accelerator pedal. This causes the tires to toe out and in during cornering, thereby adversely affecting the driving stability of the vehicle. Further, as the rubber bushings for improving driving comfort are disposed inside the treading point of the tires, the braking forces exerted on the tires when the brake pedal is depressed or an engine-brake effect occurs cause the tires to toe out and accordingly the driving stability is lowered. This means that the driving stability is lowered as the driving comfort becomes higher since the softer the rubber bushings are, the more comfortable the vehicle is to ride in. Therefore, there is a demand for a rear-suspension system which can cause the rear tires to toe in even when braking forces are exerted thereon through operation of the brake pedal or by the engine-brake effect. The ability of the rear-suspension system to always cause the tires to toe in (This ability will be referred to as "toe-in ability" hereinbelow.) ensures good driving stability during cornering. The toe-in ability of the rear suspension system is also desirable from the viewpoint of the stability of the vehicle during straight travel at a high speed, which is particularly required in case of a sports car. Actually, roads are not completely flat but inherently have bumps and recesses of various sizes which act on the tires as external disturbances in various directions. Further, winds impinging upon the vehicle body in various directions also act on the tires as external disturbances in various directions, and in particular, side winds act on the tires as lateral forces. If the rear-suspension can maintain its toe-in ability even when these external disturbances are exerted on the tires, an under-steer condition of the vehicle is always ensured, whereby the vehicle can always be stabilized. The external disturbances act as the lateral force, braking force or driving force described above irrespective of their origins.

Therefore, the rear-suspension system is desired to be able to keep its toe-in ability against any one of the lateral force, braking force (due either to operation of the brake pedal or the engine-brake effect), and driving force. The lateral force is typically a thrust load produced during cornering and comprises a force acting on the treading point of the tires from outside to inside. The braking force due to operation of the brake pedal comprises a force acting on the treading point of the tires from front to rear while the braking force due to the engine-brake effect comprises a force acting on the wheel center of the tires from front to rear. The driving force comprises a force acting on the wheel center from rear to front. The four forces, the acting point thereof and the acting direction are tabulated in the following table.

| force | acting point | direction |
| --- | --- | --- |
| lateral force | treading point | outside to inside |
| brake force | treading point | front to rear |
| engine brake force | wheel center | front to rear |
| driving force | wheel center | rear to front |

In the above table and the following description, the braking force due to operation of the brake pedal and the same due to the engine-brake effect are referred to as "brake force" and "engine-brake force", respectively, in order to clearly distinguish them from each other.

There have been developed various rear-suspension systems which can cause the rear wheels to toe in against the lateral force produced during cornering. For example, there is disclosed in Japanese Patent Publication No. 52(1977)-37649 such a rear suspension system which utilizes three rubber bushings of different hardnesses. In West German Patent Laid Open Nos. 2,158,931 and 2,355,954, there are disclosed such rear-suspension systems in which each wheel hub is supported by way of a vertical shaft and a spring. However, these systems are fairly complicated in structure. Further the prior art rear-suspension systems cannot change the camber of the rear wheels to give a negative camber to the outer wheel during cornering, though they can cause the rear wheels to toe in. Further, the prior art rear-suspension systems cannot keep their toe-in ability against all of the four forces described above, but only against the lateral force.

SUMMARY OF THE INVENTION

In view of the foregoing observations and description, the primary object of the present invention is to provide a rear-suspension mechanism which can cause the rear wheels to toe in during cornering and which is simple in structure.

Another object of the present invention is to provide a rear-suspension mechanism which can cause the rear wheels to toe in and at the same time can change the camber of the rear wheels to give them a negative camber during cornering.

In the rear-suspension mechanism of the present invention, a body side support member such as a support arm pivotably connected to the vehicle body is connected to a wheel support for supporting a rear wheel for rotation such as a wheel hub by way of a resilient connecting means so that the position of the wheel support can be changed with respect to the body side support member. An end of a stabilizer is connected to the wheel support so that the position of the wheel support is changed to cause the wheel thereon to toe in by the counterforce of the stabilizer produced when the rear wheel bumps during cornering.

The counterforce of the stabilizer generally includes a horizontal component, a vertical component (rotational component), a counterforce against a straining force which tends to outwardly pull the stabilizer and a counterforce against the straining force which tends to inwardly push the stabilizer. The present invention utilizes one of these counterforces or combinations of at least two of these counterforces to cause the rear wheel to toe in.

Further, by appropriately selecting the arrangement of the stabilizer, the resilient connecting means and the wheel support, the rear wheel can in addition be given a negative camber when the rear wheel bumps during cornering.

In one preferred embodiment of the present invention, the connecting means comprises a single ball joint and a pair of resilient bushings. By appropriately selecting the arrangement of the ball joint and the resilient bushings, the rear-suspension mechanism of the present invention can keep its toe-in ability against all of said external forces.

The present invention can be applied to any type of rear-suspension system insofar as the system can support the rear wheels to permit them to toe in. For example, the rear-suspension systems to which the present invention can be applied include those of the semi trailing type, strut type, wishbone type and De Dion type. The term "body side support member" should be interpreted as a general term which refers to a support member mounted on the side of the vehicle body, such as a semi trailing arm in the case of a semi trailing type rear-suspension system, a strut in the case of a strut type rear-suspension system, upper and lower arms in the case of a wishbone type rear-suspension system and a De Dion tube in the case of a De Dion type rear-suspension system.

DESCRIPTION OF THE PREFERRED EMBODIMENT

Figure 1:
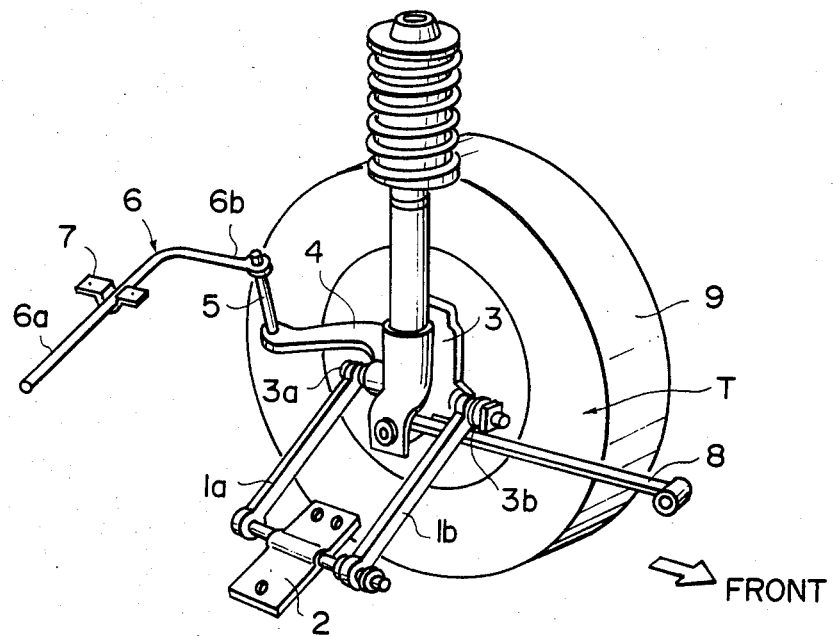
FIG. 1 is a fragmentary perspective view showing a part of a strut type twin-link suspension mechanism in accordance with a first embodiment of the present invention.

FIG. 1 shows a strut type twin-link suspension in accordance with a first embodiment of the present invention in which the horizontal component of the counterforce of the stabilizer is utilized to change the position of the rear wheels. As shown in FIG. 1, a pair of lateral links 1a and 1b (together constituting the body side support member) are pivoted on a body side bracket 2 at one end thereof and are pivotably mounted on a wheel hub 3 (as the wheel support) at the other end thereof. The lateral links 1a and 1b are pivotably mounted on the wheel hub 3 by way of a pair of rubber bushings 3a and 3b to permit the hub 3 to move in the direction of toe-in and in the direction of negative camber with respect to the lateral links 1a and 1b. The wheel hub 3 is provided with an arm-like extension 4 rearwardly extending therefrom. One end of a stabilizer 6 is connected with the free end of the arm-like extension 4 by way of a control rod 5. The stabilizer 6 comprises an intermediate portion 6a extending in the transverse direction of the vehicle body and rotatably mounted thereon by a bracket 7, and arm portions 6b which extend forward from opposite ends of the intermediate portion 6a. As is well known, when one rear wheel bumps, the stabilizer 6 produces a counterforce to push downward the rear wheel. Further, the rear end of a trailing link 8 is connected to the wheel hub 3.

Figure 2A:
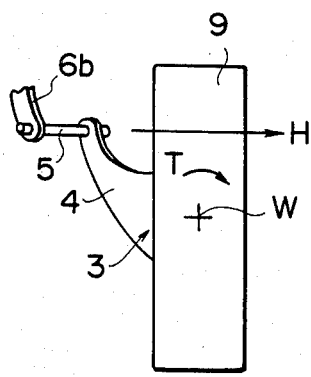
FIG. 2A is a schematic plan view of a part of the rear-suspension mechanism of FIG. 1.
Figure 2B:
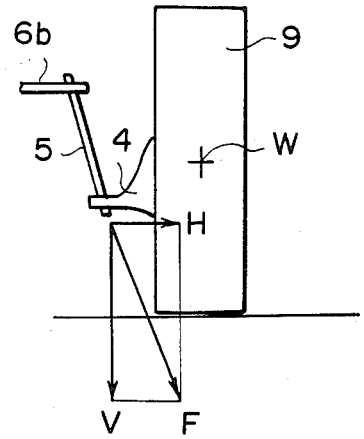
FIG. 2B is a schematic elevational view of a part of the rear-suspension mechanism of FIG. 1.

As shown in FIGS. 2A and 2B, the control rod 5 transmits the horizontal component H of the counterforce F of the stabilizer 6 (This counterforce will be referred to as "stabilizer counterforce F" hereinbelow.) from the arm portion 6b of the stabilizer 6 to the arm-like extension 4 of the hub 3 to swing the wheel hub 3 or the rear tire 9 thereon in the direction T of toe in about the center W of the wheel. That is, the control rod 5 is downwardly outwardly inclined as clearly shown in FIG. 2B so that the arm-like extension 4 of the wheel hub 3 is pushed outwardly by the horizontal component H of the stabilizer counterforce F and at the same time pushed downwardly by the vertical component V of the same. Since the arm-like extension 4 extends rearwardly from the wheel hub 3, the rear tire 9 is caused to toe in when the arm-like extension 4 is pushed outwardly.

Although the intermediate portion 6a of the stabilizer 6 is rearwardly positioned with respect to the free end of the arm-like extension 4 of the wheel hub 3 and the arm portions 6b extend forward in the first embodiment shown in FIG. 1, the intermediate portion 6a may be forwardly positioned with respect to the free end of the arm-like extension 4 so that the arm portions 6b extend rearwardly to be connected to the arm-like extension 4.

Further, though in the first embodiment, the arm-like extension 4 of the wheel hub 3 extends rearwardly so that the arm-like extension 4 is pushed outwardly, by the horizontal component H of the stabilizer counterforce F, in a position on the rear side of the wheel center W to cause the tire 9 to toe in, the arm-like extension 4 may extend forwardly to be pulled inwardly in a position on the front side of the wheel center W by the horizontal component H. In this case, the control rod 5 is inclined downwardly inwardly so that the horizontal component H of the stabilizer counterforce F acts to inwardly pull the arm-like extension 4 of the wheel hub 3 in the direction of toe-in.

Further, since the control rod 5 is connected to the arm-like extension 4 in a position below the wheel center W and the outwardly directed horizontal component H of the stabilizer counterforce F acts on the extension 4 below the wheel center W as shown in FIG. 2B, the lower part of the wheel hub 3 is displaced outwardly to give the tire 9 a negative camber during cornering.

Figure 3:
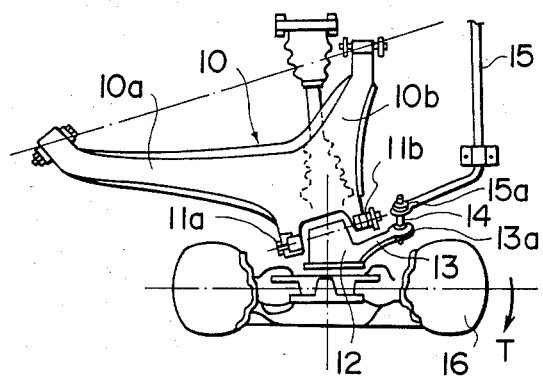
FIG. 3 is a fragmentary plan view of a semi trailing type rear-suspension mechanism in accordance with a second embodiment of the present invention.

FIG. 3 shows a semi trailing type rear-suspension in accordance with a second embodiment of the present invention in which the horizontal component of the stabilizer counterforce is utilized to change the position of the rear wheels.

In FIG. 3, a semi trailing arm 10 has a bifurcated end forming a pair of arms 10a and 10b. The other end of the semi trailing arm 10 is pivotably connected to a wheel hub 12 by way of a pair of resilient bushing assemblies 11a and 11b. The wheel hub 12 is provided with an arm-like extension 13 rearwardly extending therefrom. The free end or the rear end 13a of the arm-like extension 13 is connected, by way of a control rod 14, to the free end 15a of a forwardly extending arm portion of a stabilizer 15. The free end 15a of the arm portion of the stabilizer 15 is positioned above and inwardly offset from the rear end 13a of the arm-like extension 13 and the control rod 14 is downwardly outwardly inclined similarly to the control rod 5 in the first embodiment. Accordingly, similarly to the first embodiment, the arm-like extension 13 is pushed outwardly by the horizontal component of the stabilizer counterforce produced when the rear wheel 16 on the wheel hub 12 bumps, whereby the rear wheel 16 is caused to toe in.

Also similarly to the first embodiment, the rear wheel 16 can be given a negative camber during cornering when the junction between the arm-like extension 13 and the control rod 14 is below the wheel center.

Figure 4:
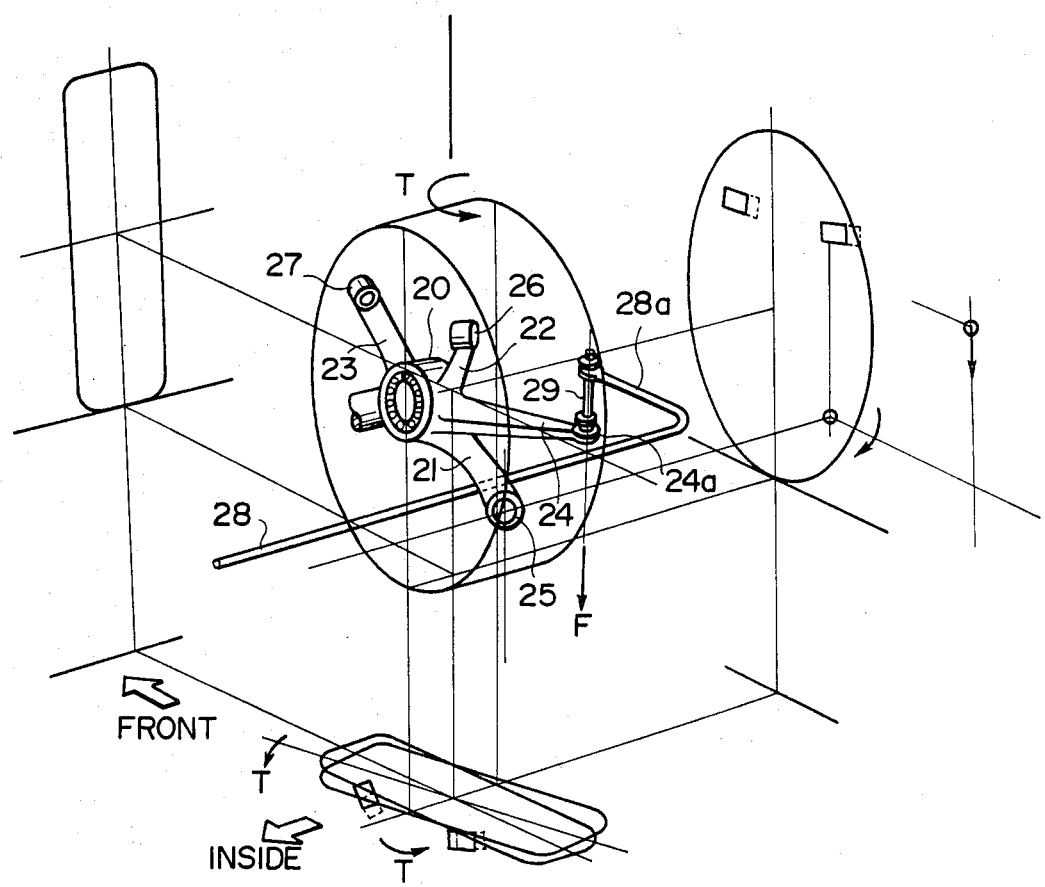
FIG. 4 is a schematic view for illustrating the principle of operation of a rear-suspension mechanism in accordance with a third embodiment of the present invention.

A rear-suspension mechanism in accordance with a third embodiment of the present invention in which the vertical or rotational component of the stabilizer counterforce is utilized to cause the rear wheel to toe in will be described referring to FIG. 4. A schematic perspective view of the right rear tire of a vehicle as viewed from the left rear quarter is shown in the middle of FIG. 4, and projections from the rear, left side and above are positioned on the left and right sides of the perspective view and below it, respectively. A wheel hub 20 for supporting the right rear tire is provided with first to fourth arm-like extensions 21 to 24 integrally extending therefrom. The first arm-like extension 21 extends downwardly rearwardly from the wheel hub 20 and is connected to the body side support member (not shown, e.g., a semi trailing arm) for pivotal movement by way of a ball joint 25. The second and third arm-like extensions 22 and 23 extend upwardly rearwardly and upwardly forwardly, respectively, and are connected to the body side support member by way of resilient bushings 26 and 27, respectively, so that the position of the wheel hub 20 can be changed with respect to the body side support member. The fourth arm-like extension 24 extends rearwardly from the wheel hub 20 and the free end 24a thereof is connected with the free end of an arm portion 28a of a stabilizer 28 by way of a control rod 29 for transmitting the counterforce of the stabilizer 28 to the fourth arm-like extension 24. The arm portion 28a is bent to extend forwardly from the body portion of the stabilizer 28 and the free end of the arm portion 28a is vertically aligned with the free end 24a of the fourth arm-like extension 24 with the control rod 29 extending vertically. The fourth arm-like extension 24 extends rearwardly beyond the ball joint 25 so that the counterforce acts thereon on the rear side of the ball joint 25. Accordingly, when the right rear wheel bumps, the stabilizer counterforce acts on the fourth arm-like extension 24 downwardly and tends to rotate the wheel hub 20 about the ball joint 25 in the clockwise direction as seen in FIG. 4. As can be seen from FIG. 4, a resilient bushing 26 connecting the second arm-like extension 22 to the body side support member is inclined rearwardly outwardly, while a resilient bushing 27 connecting the third arm-like extension 23 to the body side support member is inclined rearwardly inwardly. With this arrangement, the counterforce which tends to clockwisely rotate the wheel hub 20 is converted into a force to inwardly displace the forward part of the tire and to outwardly displace the rearward part of the same through the guiding effect of the bushings 26 and 27, whereby the rear wheel is caused to toe in.

Thus in the third embodiment of the present invention shown in FIG. 4, no horizontal component of the stabilizer counterforce is generated since the control rod 29 is positioned to extend vertically and the vertical component of the stabilizer counterforce is solely utilized to cause the wheel to toe in. In the third embodiment, the control rod 29 can be omitted and the fourth arm-like extension 24 of the wheel hub 20 may be directly connected with the free end of the arm portion 28a of the stabilizer 28.

Also in the third embodiment, the rear wheel can be given a negative camber during cornering when the junction between the control rod 29 and the fourth arm-like extension 24 is inwardly positioned with respect to the rotational center of the ball joint 25.

Figure 5:
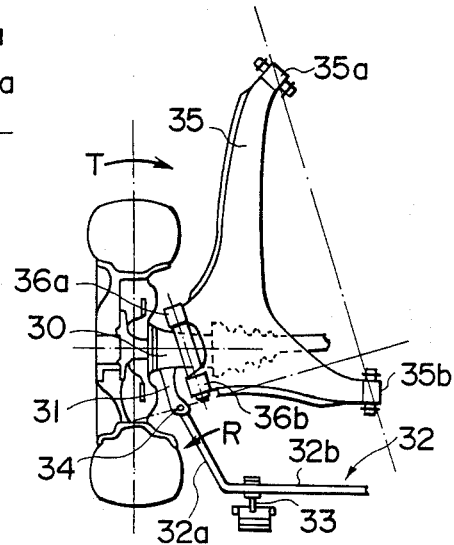
FIG. 5 is a fragmentary plan view of a semi trailing type rear-suspension mechanism in accordance with a fourth embodiment of the present invention.

FIG. 5 shows the left side portion of a semi trailing type rear-suspension mechanism in accordance with fourth embodiment of the present invention in which a stabilizer counterforce acting against a straining force is utilized to inwardly pull the stabilizer. In FIG. 5, a wheel hub 30 for the left rear wheel is connected to a semi trailing arm 35 by way of a pair of resilient bushings 36a and 36b and the semi trailing arm 35 is connected to the vehicle body by way of a pair of pivots 35a and 35b. The wheel hub 30 is provided with an arm-like extension 31. The free end of the arm-like extension 31 is connected with the free end of the forwardly extending arm portion 32a of a stabilizer 32. The junction between the free ends is indicated at 34. The body portion 32b of the stabilizer 32 extends straight in the transverse direction of the vehicle body and is supported thereon by way of a control link 33. The arm portion 32a of the stabilizer 32 is bent to extend forwardly in a horizontal plane from the body portion 32b.

Figure 6A:
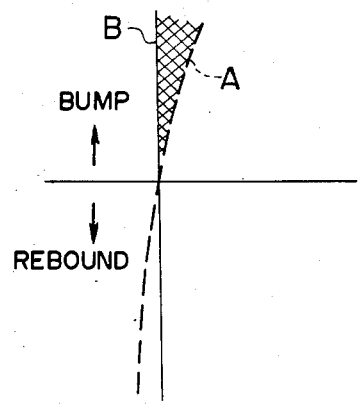
FIG. 6A is a view for illustrating the principle of operation of the rear-suspension mechanism of FIG. 5.

When the left rear wheel bumps during cornering, the free end of the arm-like extension 31 of the wheel hub 30 tends to swing upwardly about the axis passing through the pivots 35a and 35b along an arcuate path (as seen from the rear or front of the vehicle body) as indicated at A in FIG. 6A, while the free end of the arm portion 32a of the stabilizer 32 tends to swing upwardly about the body portion 32b along a straight vertical path (as seen from the rear or front of the vehicle body) as indicated at B in FIG. 6A. Since the free end of the arm-like extension 31 and the free end of the arm portion 32a of the stabilizer 32 are connected with each other, the arm portion 32a is pulled inwardly to produce an outwardly directed counterforce R when the rear wheel bumps. The outwardly directed counterforce R outwardly pushes the rearward part of the wheel hub 30 to rotate the rear wheel in the direction of toe-in T deforming the resilient bushings 36a and 36b. That is, the difference between the path A of the free end of the arm-like extension 31 and the path B of the free end of the arm portion 32a of the stabilizer 32 is accommodated by the resilient bushings 36a and 36b and the control link 33.

As can be seen from FIG. 6A, the path A of the free end of the arm-like extension 31 inwardly deviates from the path B of the free end of the arm portion 32a above the horizontal plane and outwardly deviates to some extent below the horizontal plane. Accordingly, the outwardly directed counterforce R is only produced upon bump of the wheel and is not produced during rebound.

Figure 6B:
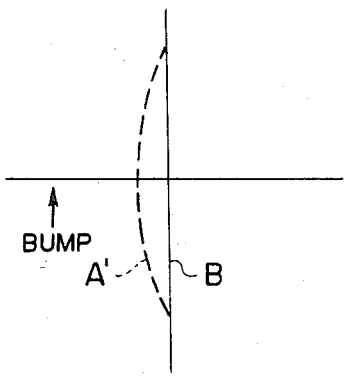
FIG. 6B is a view similar to FIG. 6A for illustrating the principle of operation of a modification of the rear-suspension mechanism of FIG. 5.

When the junction 34 between the free ends of the arm-like portion 31 and the arm portion 32a of the stabilizer 32 is positioned below the horizontal plane, the arm portion 32a of the stabilizer 32 is pushed outwardly to produce an inwardly directed counterforce upon bump of the rear wheel as can be seen from the difference between the path A' of the free end of the arm-like extension 31 and the path B of the free end of the arm portion 32a shown in FIG. 6B. The inwardly directed counterforce of the stabilizer 32 can be utilized to cause the rear tire to toe in by positioning the junction 34 in front of the wheel center.

As described above, the rear wheels can be caused to toe in against all of the external forces exerted thereon during either cornering or straight travel when the connecting means comprises a single ball joint and a pair of resilient bushings, and their arrangement is appropriately selected.

Now referring to FIGS. 7 to 13, several embodiments of the present invention in which the rear wheels can be caused to toe in against all of the external forces.

Figure 7:
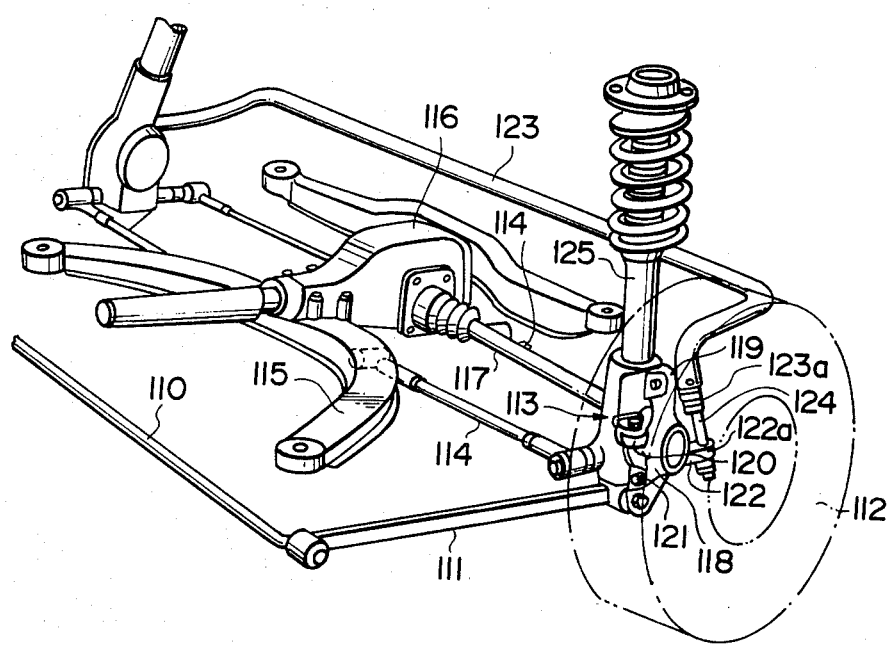
FIG. 7 is a fragmentary perspective view of a strut type twin-link suspension in accordance with a fifth embodiment of the present invention.

FIG. 7 is a perspective view showing a part of strut type twin-link suspension in accordance with a fifth embodiment of the present invention. In FIG. 7, a bracket 113 for supporting a wheel hub 118 for the left rear wheel 112 is connected to the rear end of a trailing link 111 which extends rearwardly from a body side frame 110. The bracket 113 is further connected with the lower end of a shock absorber 125 and the free ends of a pair of lateral links 114. On the wheel hub 118 is rotatably supported a drive shaft 117 laterally extending from a differential 116 which is fixedly mounted on a cross member 115.

The wheel hub 118 is connected to the bracket 113 by way of a pair of rubber bushings 119 and 120 and a single ball joint 121 so that the wheel hub 118 can be displaced about the ball joint 121. The wheel hub 118 is provided with an arm-like extension 122 rearwardly extending therefrom. The rear end 122a of the arm-like extension 122 is connected with an end 123a of a stabilizer 123 by way of a control rod 124 so that the stabilizer counterforce is transmitted to the arm-like extension 122. The control rod 124 is inclined downwardly outwardly to produce an outwardly directed horizontal component of the stabilizer counterforce.

Figure 8:
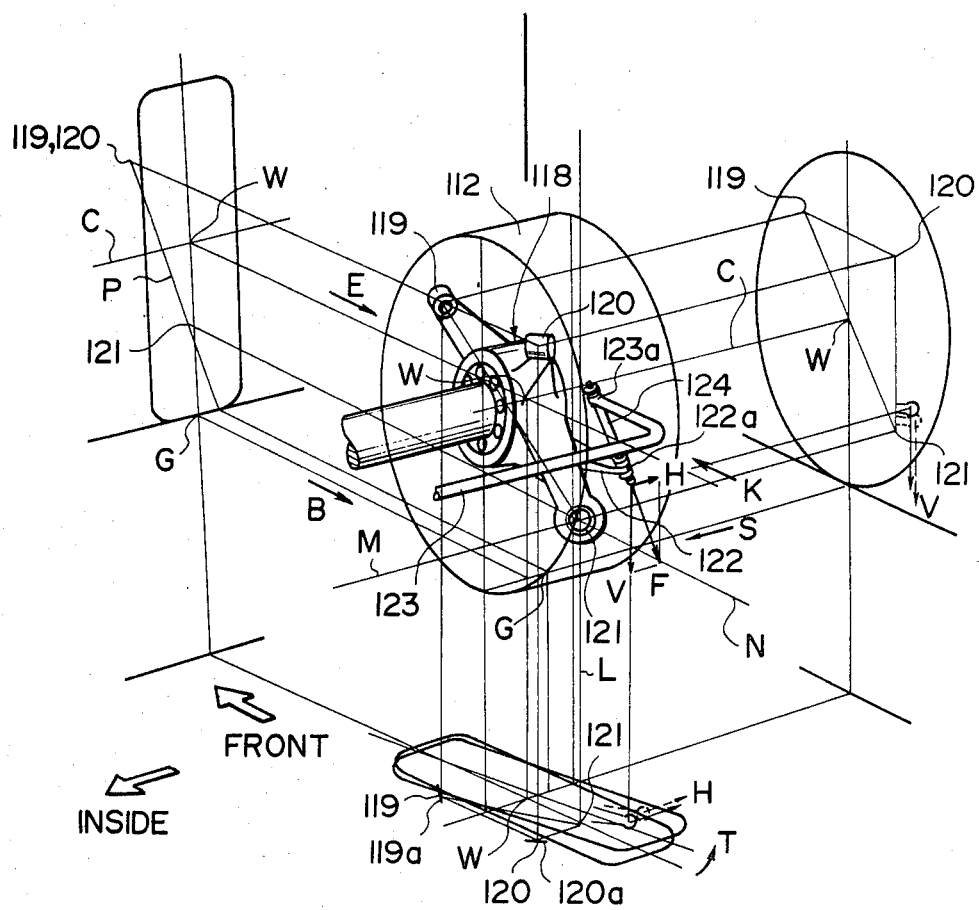
FIG. 8 is a schematic view for illustrating the principle of operation of the rear-suspension of FIG. 7.

FIG. 8 is a combined schematic view for illustrating the principle of operation of the rear-suspension mechanism of the fifth embodiment shown in FIG. 7. A schematic perspective view of the right rear wheel of a vehicle as viewed from the left rear quarter is shown in the middle of FIG. 8, and projections from the rear, left side and above are positioned on the left and right sides of the perspective view and below it, respectively. In order to discuss the position of the ball joint 121 and the rubber bushings 119 and 120, a coordinate plane having its origin on the center W of the rear wheel, its abscissa on the horizontal line passing through the center W of the rear wheel and its ordinate on the vertical line passing through the center W of the rear wheel is imagined as viewed from the left hand side of the vehicle body.

Generally speaking, when the ball joint is in the rear of the wheel center W, i.e., in quadrant I or IV, a turning moment to displace the wheel hub in the direction of toe-in about the vertical axis passing through the ball joint is generated when the lateral force is exerted on the rear wheel from outside to inside.

The ball joint 121 is displaced in quadrant IV and at least one of the rubber bushings is disposed in quadrant II or III (i.e., in front of the wheel center W) on the coordinate plane. In this particular embodiment, one rubber bushing 119 is in quadrant II and the other rubber bushing 120 is in quadrant I. Each of the quadrants on the coordinate plane should be interpreted, in this specification, to include the part of the abscissa and the ordinate separating the quadrant from the other quadrants. For example, quadrant I should be interpreted to include the right side half of the abscissa and the upper half of the ordinate.

In order to explain the principle of operation of the rear-suspension mechanisms shown in FIGS. 7 to 13, a vertical axis L passing through the ball joint 121, a horizontal axis M passing through the ball joint 121 in parallel to the axle, and a horizontal axis N passing through the ball joint 121 in the longitudinal direction of the vehicle body are imagined. Further, the position of the plane including the centers of the ball joint 121 and the rubber bushings 119 and 120 with respect to the wheel center W and the treading point G must be discussed. This plane is represented by line P in the projection from the rear in FIG. 8. In other words, the line P represents the intersectional line between the plane including the centers of the ball joint 121 and the rubber bushings 119 and 120, and the vertical plane including the central axis C of the rear wheel. The relevant plane will be referred to as "the plane P", hereinbelow.

The arrangement of the ball joint 121 and the rubber bushings 119 and 120 can be classified into four cases depending on the plane P with respect to the wheel center W and the treading point G. In the first case, the plane P is outwardly offset from the treading point G at the height of the treading point G (This condition is symbolized by G— in this specification.) and at the same time is outwardly offset from the wheel center W at the height of the wheel center W (This condition is symbolized by W—, and the first case is symbolized by G—W—.). In the second case, the plane P is outwardly offset from the treading point G at the height thereof (G—) but is inwardly offset from the wheel center W at the height thereof (W+). That is, the second case is symbolized by G—W+. Similarly, the third and the fourth cases are symbolized by G+W+ and G+W—, respectively.

As described above, the lateral force acts on the treading point G of the tire from outside to inside as indicated at S, the brake force acts on the treading point G from front to rear as indicated at B, the engine-brake force acts on the wheel center W from front to rear as indicated at E, and the driving force acts on the wheel center W from rear to front as indicated at K.

When the relevant plane P is outwardly offset from the treading point G at the height thereof (G—), a turning moment in the direction of toe-in is generated about the imaginary vertical axis L when a force is exerted on the treading point G from front to rear. Thus, by outwardly offsetting the relevant plane P from the treading point G at the height thereof, the rear tire can be effectively caused to toe in against the brake force B which acts on the treading point G from front to rear.

Further when the relevant plane P is inwardly offset from the wheel center W at the height thereof (W+), a turning moment in the direction of toe-in is generated about the vertical axis L when a force is exerted on the wheel center W from rear to front, and a turning moment in the direction of toe-out is generated about the vertical axis L when a force is exerted on the wheel center W from front to rear. On the other hand, when the relevant plane P is outwardly offset from the wheel center W at the height thereof (W—), a turning moment in the direction of toe-in is generated about the vertical axis L when a force is exerted on the wheel center W from front to rear, and a turning moment in the direction of toe-out is generated about the vertical axis L when a force is exerted on the wheel center W from rear to front. Accordingly when the relevant plane P is inwardly offset from the wheel center W at the height thereof (W+), the rear tire is effectively caused to toe in against the driving force K which acts on the wheel center W from rear to front. However, in this case, the rear tire will be caused to toe out when the engine-brake force E is exerted on the wheel center W from front to rear. On the other hand, when the relevant plane P is outwardly offset from the wheel center W at the height thereof (W—), the rear tire is caused to toe in when the engine-brake force E is exerted on the wheel center W, while the rear tire is caused to toe out when the driving force K is exerted on the wheel center W.

In the fifth embodiment shown in FIG. 7, the plane P is inwardly offset from the wheel center W at the height thereof (W+) and is outwardly offset from the treading point G at the height thereof (G—) as clearly shown in FIG. 8. Further, the central axes 119a and 120a of the rubber bushings 119 and 120 are directed so as to inwardly guide the forward part of the wheel hub 118 when the wheel hub 118 rotates clockwisely about the ball joint 121. In this particular embodiment, the central axis 119a of the forward rubber bushing 119 is inclined rearwardly inwardly and the central axis 120a of the rearward rubber bushing 120 is inclined rearwardly outwardly. The orientation of the rubber bushings 119 and 120 is changed according to their position. For example, when the forward bushing 119 is positioned in quadrant III to extend in a horizontal plane or with its forward part positioned higher than its rearward part, the central axis 119a is inclined forwardly inwardly.

When the lateral force S acts on the treading point G of the tire from outside to inside during cornering, for example, a turning moment in the counterclockwise direction as seen from above is generated about the imaginary vertical axis L, and the wheel hub 118 is displaced in the direction of toe-in deforming the rubber bushings 119 and 120, whereby the tire is caused to toe in. When the forward rubber bushing 119 is less hard than the rearward bushing 120, the wheel can be caused to toe in more easily. At the same time, the stabilizer counterforce F is generated through bump of the wheel during cornering, and the stabilizer counter-force F is transmitted from the stabilizer 123 to the arm-like extension 122 of the wheel hub 118 by way of the control rod 124 to act on the rear end thereof downwardly outwardly. The vertical component V of the stabilizer counterforce F generates a turning moment to displace the wheel hub 118 in the clockwise direction (as seen from the left of FIG. 8) about the ball joint 121 or the horizontal axis M, and at the same time, the horizontal component H of the stabilizer counterforce F outwardly displaces the rearward part of the tire to tend to cause the tire to toe in. The clockwise turning moment is converted into a force to inwardly displace the forward part of the wheel hub and outwardly displace the rearward part of the same through the guiding effect of the bushings 119 and 120 due to the inclination of their central axes.

Thus, the rear wheel is effectively caused to toe in during cornering by virtue of the lateral force S exerted thereon and the stabilizer counterforce produced upon bump of the rear wheel during cornering.

When the brake force B is exerted on the treading point G from front to rear, a turning moment in the direction of toe-in (the counterclockwise direction as seen from above) is generated about the vertical axis L by virtue of the fact that the plane P is outwardly offset from the treading point G at the height thereof, and at the same time a turning moment to displace the wheel counterclockwisely (as seen from the left of FIG. 8) is generated about the horizontal axis M. The latter turning moment is converted into a force to cause the wheel to toe out through the guiding effect of the bushings 119 and 120. If the latter turning moment is larger than the former turning moment, the wheel cannot be caused to toe in. This can be avoided by providing a stopper in front of one of the bushings 119 and 120 as will be described in more detail hereinbelow referring to FIGS. 15A and 15B.

When the engine-brake force E is exerted on the wheel center W from front to rear, a turning moment to clockwisely displace the wheel is generated about the horizontal axis M. This turning moment is converted into a force to cause the wheel to toe in through the guiding effect of the bushings 119 and 120 as described above with respect to the stabilizer counterforce F. At the same time, the engine-brake force E generates a turning moment in the direction of toe-out about the vertical axis L since the plane P is inwardly offset from the wheel center W. However, the tire can be caused to toe in totally since the toe-in effect due to the turning moment about the horizontal axis M is larger than the toe-out effect due to the turning moment about the vertical axis L. This is because the rubber bushings 119 and 120 are apt to be deformed more easily in the axial direction than in the transverse direction, and the amount of the offset of the ball joint 121 from the wheel center W in the vertical direction is larger than that in the horizontal direction.

When the driving force K is exerted on the wheel center W from rear to front, a turning moment in the counterclockwise direction is generated about the horizontal axis M and is converted into a force to cause the tire to toe out through the guiding effect of the bushings 119 and 120. This force overcomes the turning moment in the direction of toe-in generated about the vertical axis L to cause the wheel to toe in since the driving force K acts on the wheel center W in the direction opposite to the engine-brake force E. However, the wheel can be caused to toe in by providing a stopper in front of one of the bushings 119 and 120 to restrict the counterclockwise rotational displacement about the horizontal axis M. When the stopper is provided in front of one of the bushings 119 and 120, a turning moment to turn the tire in the direction of toe-in is generated about the line connecting the ball joint 121 and the bushing provided with the stopper, whereby the wheel is caused to toe in when the driving force K is exerted on the wheel center W.

Thus the rear-suspension mechanism in accordance with the fifth embodiment of the present invention shown in FIG. 7 can cause the rear wheel to toe in when it bumps during cornering and at the same time can cause the rear wheel to toe in against all of the four external fources, i.e., the lateral force S, the brake force B, the engine-brake force E and the driving force K, either during cornering of during straight travel.

Figure 9A:
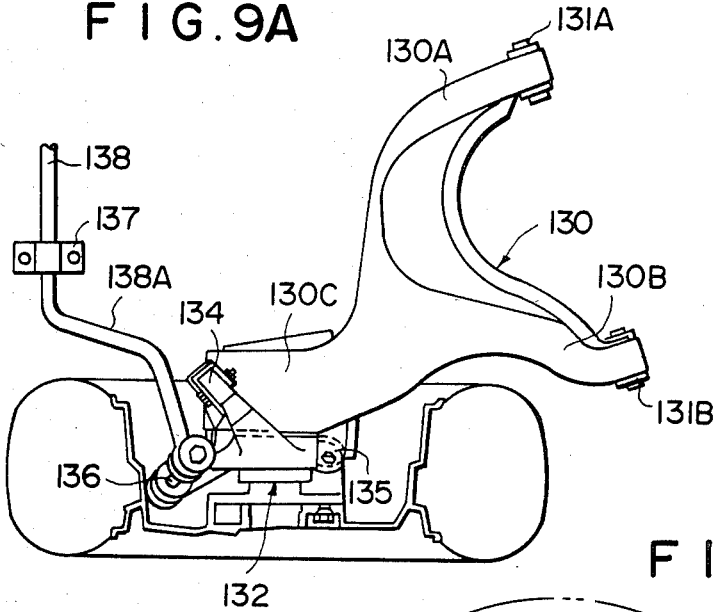
FIG. 9A is a fragmentary plan view of the right side part of a semi trailing type rear-suspension mechanism in accordance with a sixth embodiment of the present invention, with a part of the right rear tire cut away.
Figure 9B:
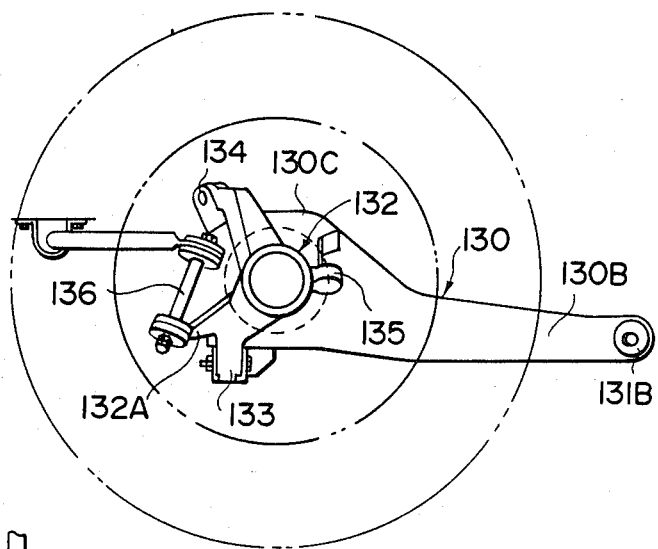
FIG. 9B is a side view of FIG. 9A seen from the right side with the right rear tire being shown by a chained line.
Figure 9C:
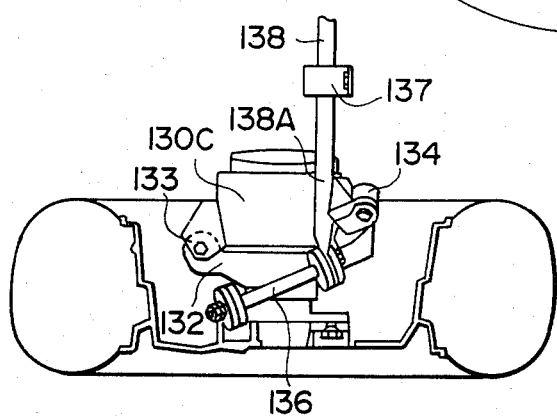
FIG. 9C is a side view of FIG. 9A seen from the left side.

FIGS. 9A to 9C show the sixth embodiment of the present invention in which the rear wheels can be caused to toe in against all of the external forces.

The rear suspension mechanism of the sixth embodiment is of semi trailing type, and includes a semi trailing arm 130 having a bifuracated end forming a pair of arms 130A and 130B. The other end 130C of the semi trailing arm 130 is pivotably connected to a wheel hub 132 by way of a ball joint 133 and a pair of rubber bushings 134 and 135. The wheel hub 132 is provided with an arm-like extension 132A rearwardly extending therefrom. The rear end of the arm-like extension 132A is connected, by way of a control rod 136, to the forward end of the forwardly extending arm portion 138A of a stabilizer 138 which is supported on the vehicle body by way of a bracket 137. The control rod 136 extends downwardly outwardly from the forward end of the arm portion 138A of the stabilizer 138 to the rear end of the arm-like extension 132A.

The arrangement of the ball joint 133 and the bushings 134 and 135 is the same as that of the fifth embodiment shown in FIG. 7 except that the forward rubber bushing 135 is positioned lower than the rearward rubber bushing 134, i.e., in quadrant III, and at the same time is inclined upwardly inwardly to inwardly guide the rotation of the wheel hub 132 in the clockwise direction as seen from the left of the vehicle body.

In this embodiment, the rear wheel is caused to toe-in against all of the four external forces in a manner similar to that in the fifth embodiment.

Figure 10:
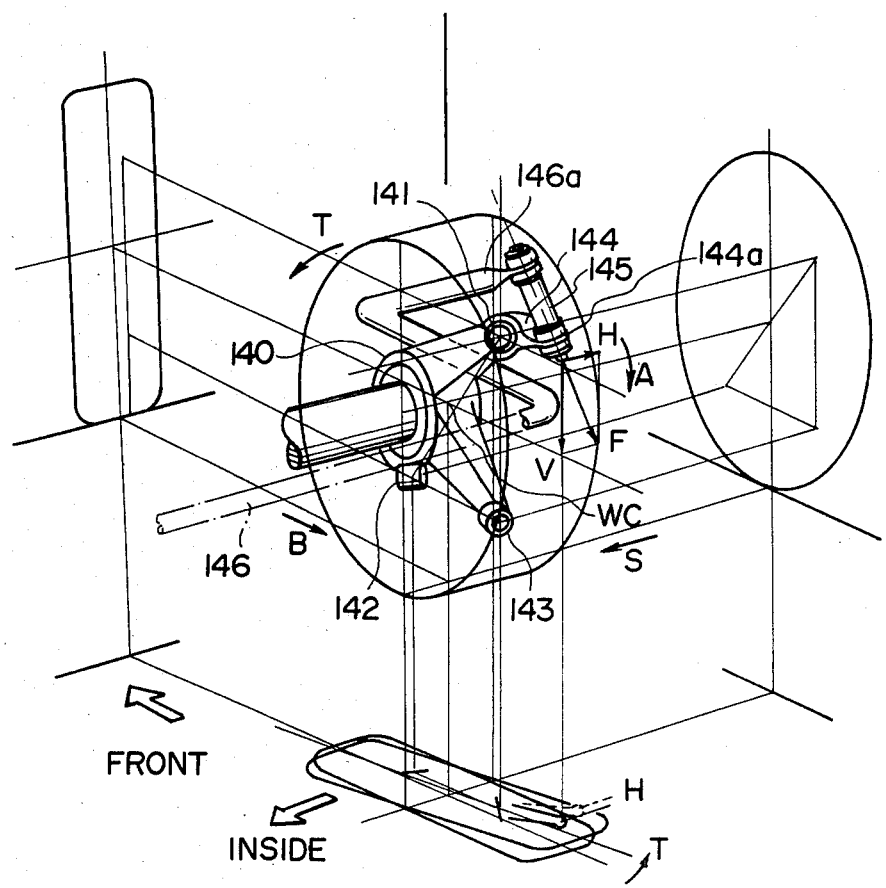
FIG. 10 is a schematic view similar to FIG. 8 but of another embodiment of the present invention.

In another embodiment of the present invention shown in FIG. 10, a wheel hub 140 is supported by way of a ball joint 141 positioned in quadrant I, and rubber bushings 142 and 143 positioned in quadrant III and IV, respectively. The ball joint 141 is positioned at an intermediate portion of an arm-like extension 144 extending rearwardly from the wheel hub 140. The rear end 144a of the arm-like extension 144 is connected to an end 146a of a cranked stabilizer 146 by way of a control rod 145. The control rod 145 extends downwardly outwardly from the end 146a of the stabilizer 146 to the rear end 144a of the arm-like extension 144 so that both the vertical component V and the horizontal component H can be drawn out from the stabilizer counterforce F produced upon bump of the right rear wheel on the wheel hub 140. When the stabilizer counterforce F is produced upon bump of the right rear wheel, the vertical component V thereof tends to displace the wheel hub 140 in the clockwise direction about the horizontal axis passing through the ball joint 141 as shown by the arrow A in FIG. 10. At the same time the horizontal component H pushes the rearward part of the wheel hub 140 in the counterclockwise direction seen from above about the vertical axis passing through the ball joint 141, i.e., in the direction of toe-in. The clockwise displacement of the wheel hub 140 about the horizontal axis passing through the ball joint 141 is converted into a displacement of the wheel hub 140 in the direction of toe-in through the guiding effect of the bushings 142 and 143 as will be described in detail referring to FIG. 11.

When the rear end 144a of the arm-like extension 144 on which the stabilizer counterforce F is exerted is positioned inside the ball joint 141, the wheel hub 140 can be displaced also in the direction of negative camber.

In order to cause the rear wheel to toe in against various external forces exerted on the rear wheel during either cornering or straight travel, various arrangements of the ball joint and the rubber bushings can be employed. In the following examples, the rear wheel is caused to toe in upon bump of the rear wheel during cornering in the same manner as in the preceding examples, and therefore only the arrangement of the ball joint and the bushings, and the principle of operation thereof will be described.

Figure 11:
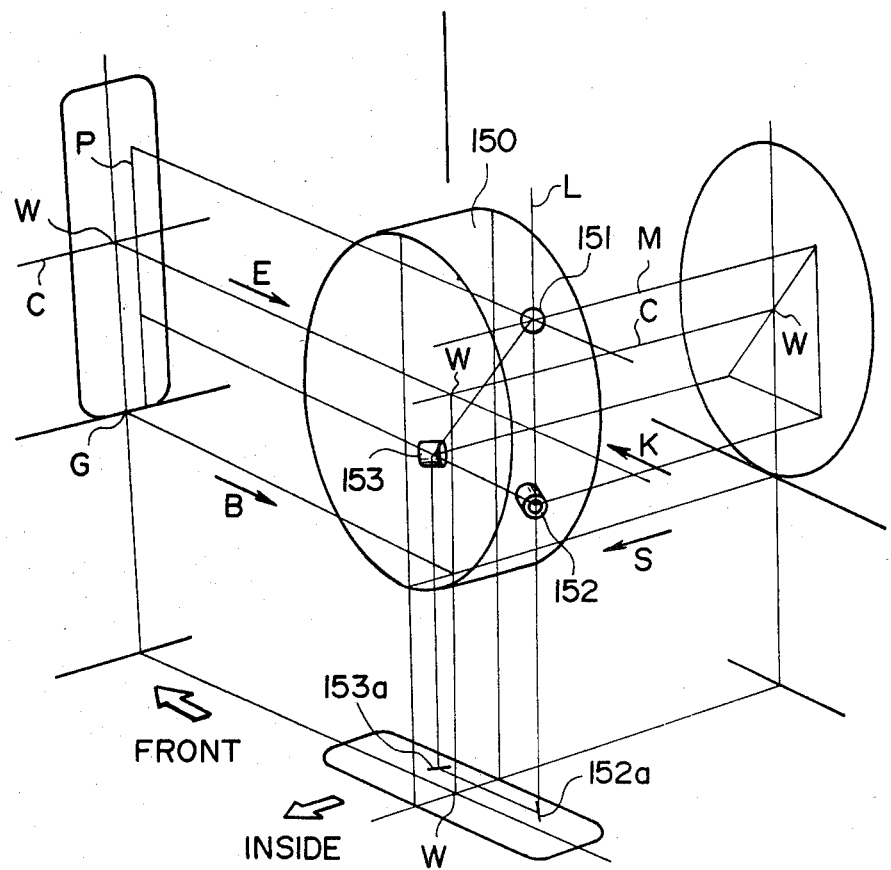
FIGS. 11 to 13 are schematic views for illustrating different embodiments of the present invention.
Figure 12:
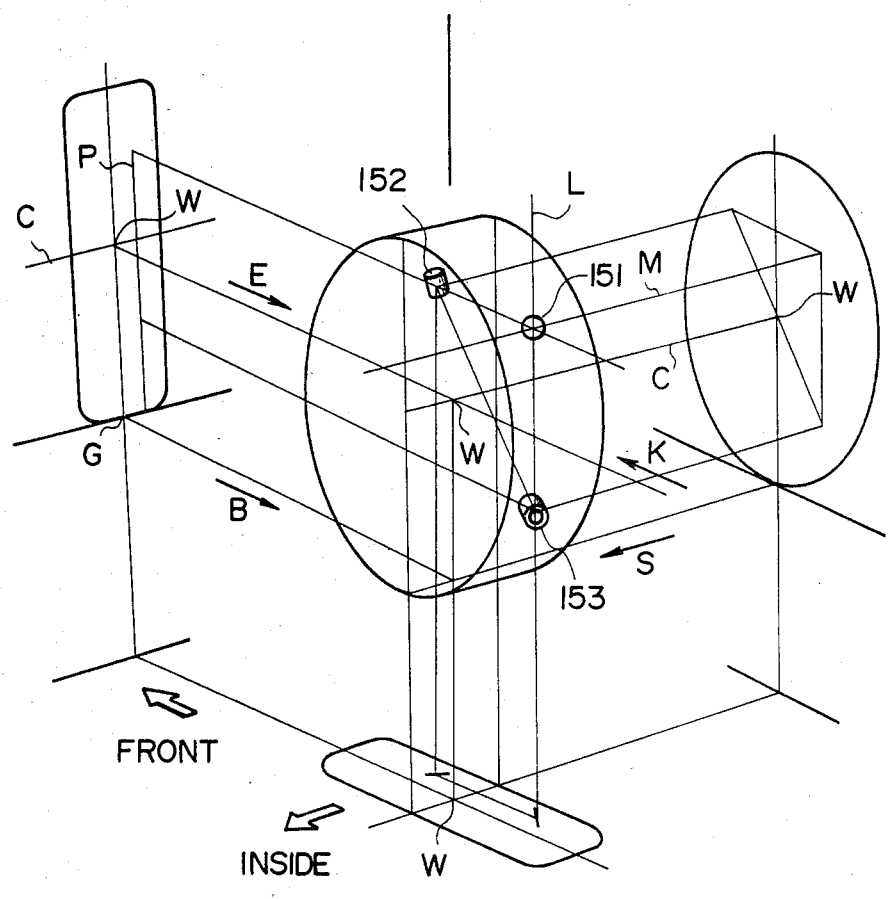
Figure 13:
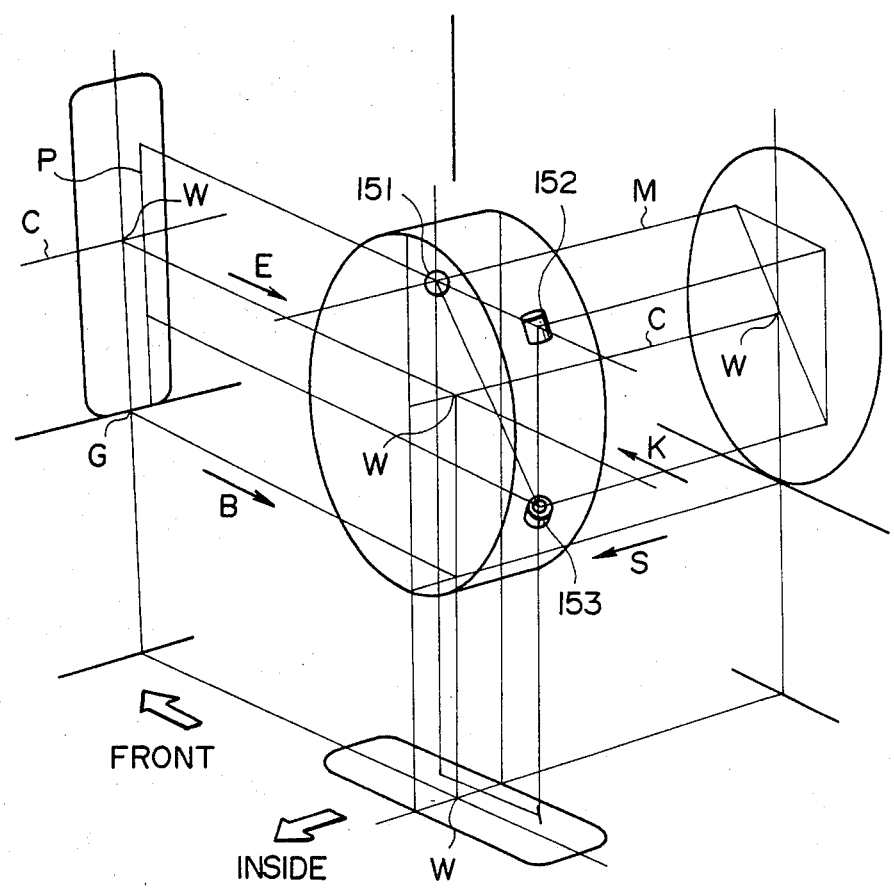

In three embodiments of the present invention respectively shown in FIGS. 11 to 13, said plane P including the centers of the ball joint and the rubber bushings is outwardly offset from both the wheel center and the treading point (G—W—). The right rear wheel, the ball joint and the rubber bushings are indicated at 150, 151, 152 and 153, respectively, throughout FIGS. 11 to 13.

In the embodiment shown in FIG. 11, the ball joint 151 is in quadrant I and the rubber bushings 152 and 153 are in quadrants IV and III, respectively. The central axes 152a and 153a of the bushings 152 and 153 are directed to inwardly guide the forward part of the wheel 150 to cause the wheel 150 to toe in when the wheel 150 or the wheel hub supporting it is turned in the clockwise direction about the ball joint 151. That is, the central axis 152a of the rearward bushing 152 is inclined rearwardly inwardly and the central axis 153a of the forward bushing 153 is inclined rearwardly outwardly. The orientation of the rubber bushings 152 and 153 is changed according to their position. For example, when the forward bushing 153 is positioned in the upper part of quadrant II to extend in a horizontal plane or with its rearward part positioned higher than its forward part, the central axis 153a thereof is directed rearwardly inwardly.

When the lateral force S acts on the treading point of the wheel 150 from outside to inside during cornering, for example, a turning moment in the counterclockwise direction as seen from above is generated about the vertical axis L, and the wheel 150 is displaced in the direction of toe-in deforming the rubber bushings 152 and 153.

When the brake force B is exerted on the treading point of the wheel from front to rear, a turning moment in the direction of toe-in (the counterclockwise direction as seen from above) is generated about the vertical axis L by virtue of the fact that the plane P is outwardly offset from the treading point at the height thereof, and at the same time a turning moment to displace the wheel 150 counterclockwisely as seen from the left of FIG. 11 is generated about the horizontal axis M. The latter turning moment is converted into a force to cause the wheel 150 to toe out through the guiding effect of the bushings 152 and 153. If the latter turning moment is larger than the former turning moment, the wheel 150 cannot be caused to toe in. This can be avoided by providing a stopper behind one of the bushings 152 and 153 as will be described in more detail referring to FIGS. 15A and 15B.

When the engine-brake force E is exerted on the wheel center W from front to rear, a turning moment in the direction of toe-in is generated about the vertical axis L by virtue of the fact that the plane P is outwardly offset from the wheel center W, and at the same time a turning moment to displace the wheel 150 in the counterclockwise direction is generated about the horizontal axis M. The latter turning moment is converted into a force to cause the wheel 150 to toe out through the guiding effect of the bushings 152 and 153. However, the force to cause the wheel to toe out can be limited providing a stopper behind one of the bushings 152 and 153. When the stopper is provided behind one of the bushings, the wheel 150 can be displaced only in the direction of toe-in about a line connecting the ball joint 151 and the bushing provided with the stopper.

When the driving force K is exerted on the wheel center W from rear to front, a turning moment to displace the wheel in the direction of toe-out is generated about the vertical axis L while a turning moment to displace the wheel 150 in the clockwise direction, which is converted into a force to displace the wheel 150 in the direction of toe-in through the guiding effect of the bushings 152 and 153, is generated about the horizontal axis M, and the wheel 150 is, overall, caused to toe in. However, the wheel 150 can be positively caused to toe in by providing a stopper behind one of the bushings 152 and 153 for restricting the counterclockwise rotational displacement of the wheel 150 about the horizontal axis M.

In the embodiment shown in FIG. 12, the ball joint 151 is in quadrant I and the rubber bushings 152 and 153 are in quadrants II and IV, respectively. The forward bushing 152 in quadrant II is inclined upwardly inwardly while the rearward bushing 153 in quadrant IV is inclined rearwardly inwardly, to inwardly guide the forward part of the wheel 150 and outwardly guide the rearward part of the same when the wheel 150 is clockwisely displaced about the horizontal axis M. The operation of this embodiment will be apparent to those skilled in the art from the description with respect to the embodiment shown in FIG. 11, and accordingly will not be described here.

In the embodiment shown in FIG. 13, the ball joint 151 is in quadrant II and the rubber bushings 152 and 153 are in quadrants I and IV, respectively. Both the rubber bushings 152 and 153 are directed upwardly inwardly to inwardly guide the forward part of the wheel 150 and to outwardly guide the rearward part of the same when the wheel 150 is displaced in the clockwise direction about the horizontal axis M.

When either the brake force B or the engine-brake force E is exerted on the wheel 150, a turning moment to displace the wheel 150 in the direction of toe-in is generated about the vertical axis L by virtue of the fact that the plane P is outwardly offset from both the wheel center W and the treading point. However, if the wheel 150 is displaced in the counterclockwise direction about the horizontal axis M, the wheel 150 is guided in the direction of toe-out. Therefore, a stopper is provided on the upper side of the lower bushing 153 to prevent the counterclockwise rotation of the wheel 150 about the horizontal axis M.

When the driving force K is exerted on the wheel 150, a turning moment to displace the wheel 150 in the clockwise direction is generated about the horizontal axis M and the wheel 150 is caused to toe in through the guiding effect of the bushings 152 and 153.

When the lateral force S is exerted on the treading point from outside to inside during straight travel, a turning moment to displace the wheel 150 in the direction of toe-out is generated about the vertical axis L since the ball joint 151 is forwardly positioned with respect to the wheel center W, though the wheel 150 is positively caused to toe in by the stabilizer counterforce during cornering. It is preferred that the inside part of each bushing be stiffened to prevent displacement of the wheel 150 in the direction of toe-out.

Figure 14A:
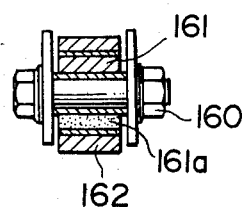
FIG. 14A is a longitudinal sectional view of an example of the rubber bushing employed in the embodiments shown in FIGS. 7 to 12.
Figure 14B:
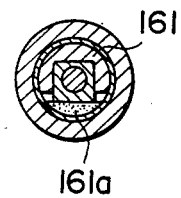
FIG. 14B is a transverse sectional view of the rubber bushing of FIG. 14A.

FIGS. 14A and 14B show an example of a rubber bushing one side of which is stiffened. In FIGS. 14A and 14B, the rubber bushing includes a shaft portion 160 which is fixed to the body side support member, and a cylindrical rubber portion 161 surrounding the shaft portion 160. The cylindrical rubber portion 161 is provided with a rigid material 161a on one side thereof. Reference numeral 162 indicates the bearing portion formed in the wheel hub. When the inside part of the resilient bushing is to be stiffened as in the embodiment shown in FIG. 13, the bushing is mounted with its side provided with the rigid material 161a being directed to the inside of the vehicle body.

Figure 15A:
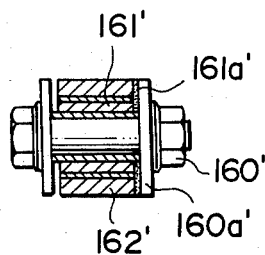
FIG. 15A is a longitudinal sectional view of another example of the rubber bushing employed in the embodiments shown in FIGS. 7 to 12.
Figure 15B:
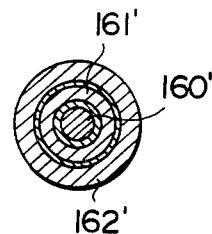
FIG. 15B is a transverse sectional view of the rubber bushing of FIG. 15A.

FIGS. 15A and 15B show an example of a rubber bushing provided with a stopper at one end thereof. In FIGS. 15A and 15B, this rubber bushing includes a shaft portion 160' which is fixed to the body side supporting member, and a cylindrical rubber portion 161' surrounding the shaft portion 160'. A stopper 161a' is disposed between a flange 160a' on one end of the shaft portion 160 and the bearing portion 162' formed in the wheel hub.

Figure 16:
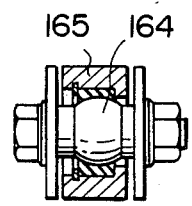
FIG. 16 is a sectional view of the ball joint employed in the embodiments shown in FIGS. 7 to 12.

FIG. 16 shows an example of the ball joint which can be employed in the present invention. The ball joint has a spherical portion 164 which permits pivotal movement about a point but does not permit axial displacement. Reference numeral 165 indicates a bearing portion formed in the wheel hub.

In the embodiments shown in FIGS. 7 to 13, a single ball joint and a pair of resilient bushings are used for causing the rear wheel to toe in when the rear wheel is displaced in the clockwise direction about the vertical axis passing through the ball joint. However, the wheel hub may be connected to the body side support member by way a single ball joint and a single bushing in order to cause the wheel to toe in upon its bump during cornering by the horizontal component of the stabilizer counterforce with the stabilizer being connected to the wheel hub to act thereon in the rear of the ball joint.

We claim:

1. A vehicle rear-suspension mechanism for use with a vehicle body having rear wheels, said mechanism comprising
    two body side support members each pivotably connected to the vehicle body,
    wheel supports for supporting the rear wheels for rotation,
    a resilient connecting means including at least one resilient bushing for connecting each wheel support to the body side support member to permit the wheel support to change its position with respect to the body side support member, and
    a stabilizer whose ends are connected to the respective wheel supports so that a counterforce applied to one of said wheel supports, when the one rear wheel of said one wheel support bumps, produces a deformation in the resilient connecting means to thereby cause the one rear wheel to toe in.

2. A vehicle rear-suspension mechanism as defined in claim 1 in which said counterforce of the stabilizer is a force which counteracts the upward movement of the wheel support when the rear wheel thereon bumps.

3. A vehicle rear-suspension mechanism as defined in claim 2 in which said resilient connecting means comprises a single ball joint and a pair of resilient bushings, and said stabilizer is connected to the wheel support at an acting point thereon positioned to the rear of the ball joint so that the wheel support is adapted to be displaced about a horizontal axis passing through the ball joint in the clockwise direction as seen from the left of the vehicle body by the vertical component of said counterforce of the stabilizer, said resilient bushings being arranged to guide the wheel support in the direction of toe-in when it is displaced in the clockwise direction.

4. A vehicle rear-suspension mechanism as defined in claim 3 in which said acting point on the wheel support is outwardly offset from the corresponding end of the stabilizer and is connected thereto by a control rod extending downwardly outwardly from the end of the stabilizer to the acting point on the wheel support so that both the vertical component and the outwardly directed horizontal component of said counterforce are exerted on the acting point by way of the control rod, said ball joint and the bushings being arranged to permit the wheel support to pivot in the direction of toe-in about the vertical axis passing through the ball joint under the force of the outwardly directed horizontal component of the counterforce.

5. A vehicle rear-suspension mechanism as defined in claim 3 in which said wheel support is provided with an arm-like extension extending rearwardly therefrom and said acting point is on the free end portion of the arm-like extension.

6. A vehicle rear-suspension mechanism as defined in claim 4 in which said ball joint is positioned to the rear of the center of the rear wheel.

7. A vehicle rear-suspension mechanism as defined in claim 6 in which said ball joint is positioned in quadrant IV on a coordinate plane having its origin on the center of the rear wheel, its abscissa on the horizontal line passing through the center of the rear wheel and its ordinate on the vertical line passing through the center of the rear wheel as viewed from the left hand side of the vehicle body.

8. A vehicle rear-suspension mechanism as defined in claim 7 in which one of said bushings is in quadrant I and the other bushing is in quadrant II, the central axis of the bushing in quadrant I being directed rearwardly outwardly and the central axis of the bushing in quadrant II being directed rearwardly inwardly to guide said wheel support in the direction of toe-in when it is displaced in the clockwise direction about the horizontal axis passing through the ball joint.

9. A vehicle rear-suspension mechanism as defined in claim 8 in which said bushing in quadrant II is less hard than said bushing in quadrant I.

10. A vehicle rear-suspension mechanism as defined in claim 8 in which the intersectional line between the plane including the centers of the ball joint and the bushings and the vertical plane including the central axis of the rear wheel is outwardly offset from the treading point of the rear wheel at the height of the treading point and is inwardly offset from the center of the rear wheel at the height of the center of the rear wheel.

11. A vehicle rear-suspension mechanism as defined in claim 10 in which one of said bushings is provided with a stopper in front of it to restrict a counterclockwise displacement of the wheel support about the horizontal axis passing through the ball joint.

12. A vehicle rear-suspension mechanism as defined in claim 6 in which said ball joint is in quadrant I on a coordinate plane having its origin on the center of the rear wheel, its abscissa on the horizontal line passing through the center of the rear wheel and its ordinate on the vertical line passing through the center of the rear wheel as viewed from the left hand side of the vehicle body.

13. A vehicle rear-suspension mechanism as defined in claim 12 in which said bushings are respectively positioned in quadrants III and IV, the central axis of the bushing in quadrant III being directed rearwardly outwardly and the central axis of the bushing in quadrant IV being directed rearwardly inwardly to guide the wheel support in the direction of toe-in when it is displaced in the clockwise direction about the horizontal axis passing through the ball joint.

14. A vehicle rear-suspension mechanism as defined in claim 12 in which said bushings are respectively positioned in quadrants II and IV, the central axis of the bushing in quadrant II being directed upwardly inwardly and the central axis of the bushing in quadrant IV being directed rearwardly inwardly to guide the wheel support in the direction of toe-in when it is displaced in the clockwise direction about the horizontal axis passing through the ball joint.

15. A vehicle rear-suspension mechanism as defined in claim 4 in which said ball joint and the pair of bushings are respectively positioned in quadrants II, I and IV with the intersectional line between the plane including the centers of the ball joint and the bushings and the plane including the central axis of the rear wheel being outwardly offset from both the center of the rear wheel and the treading point of the same at the respective height thereof, and the central axes of both the bushings being directed upwardly inwardly to guide the wheel support in the direction of toe-in when it is displaced in the clockwise direction about the horizontal axis passing through the ball joint.

16. A vehicle rear-suspension mechanism as defined in claim 4 in which said acting point is positioned inside the ball joint.

17. A vehicle rear-suspension mechanism as defined in claim 2 in which said resilient connecting means comprises a single ball joint and at least one resilient bushing, and said stabilizer is connected, by way of a control rod, to the wheel support at an acting point thereon positioned to the rear of the ball joint, said control rod extending downwardly outwardly from the end of the stabilizer to the acting point on the wheel support so that the outwardly directed horizontal component of the counterforce is exerted on the acting point, and said ball joint and resilient bushing being arranged to permit the wheel support to pivot in the direction of toe-in about the vertical axis passing through the ball joint under the force of the outwardly directed horizontal component of the counterforce.

18. A vehicle rear-suspension mechanism as defined in claim 2 in which said resilient connecting means comprises a pair of resilient bushings and said stabilizer is connected, by way of a control rod, to the wheel support at an acting point thereon positioned to the rear of the center of the rear wheel, said control rod extending downwardly outwardly from the end of the stabilizer to the acting point on the wheel support so that the outwardly directed horizontal component of said counterforce is exerted on the acting point, and said pair of resilient bushings being arranged to permit the wheel support to pivot in the direction of toe-in about the vertical axis passing through the center of the rear wheel under the force of the outwardly directed horizontal component of the counterforce.

19. A vehicle rear-suspension mechanism as defined in claim 18 in which said acting point is positioned lower than the center of the rear wheel, and said resilient bushings are arranged to permit the rotational displacement of the wheel support in the direction of negative camber.

20. A vehicle rear-suspension mechanism for use with a vehicle body having rear wheels, said mechanism comprising two body side support members each pivotably connected to the vehicle body, wheel supports for supporting the rear wheels for rotation, a pair of longitudinally spaced resilient connecting means for connecting each wheel support to one of the two body side support members, and a stabilizer whose ends are connected to the respective wheel supports so that a counterforce is applied to one wheel support, when the rear wheel supported by the one wheel support bumps producing in the pair of resilient connecting means deformations which cause the rear wheel supported by the one wheel support to toe in.

* * * * *